Inventor
C. F. Johnson
G. G. Harrington

Inventor
C. F. Johnson
G. G. Harrington.

June 24, 1941.　　C. F. JOHNSON ET AL　　2,246,801
VALVE
Filed Jan. 9, 1939　　3 Sheets-Sheet 3

Inventors
C. F. JOHNSON
G. G. HARRINGTON.
By J. Vincent Martin
and
Ralph R. Browning.
Attorneys Patented June 24, 1941

2,246,801

UNITED STATES PATENT OFFICE 2,246,801

VALVE

Charles F. Johnson and George G. Harrington, Houston, Tex., assignors to Reed Roller Bit Company, Houston, Tex., a corporation of Texas Application January 9, 1939, Serial No. 249,914

2 Claims. (Cl. 251—102)

This invention relates to valves and has particular reference to that type of valve known as a plug valve.

The general object of this invention is to provide a valve of the type referred to which will have a minimum amount of frictional resistance against movement and yet in which substantially all the seating surfaces will be protected at all times.

In the usual type of plug valve having a tapered seat, that is a valve in which the valve body is provided with a tapered opening receiving a plug of similar shape, which plug has a passageway therethrough for conducting the fluid flow when the valve is in its open position, substantially all of the seating surfaces are protected at all times. However, it is well known that in valves of this type the friction between the relatively movable parts is very great, resulting in sticking, wear, and particularly great resistance to movement where extremely high pressures are involved.

Attempts to avoid the great friction present in the valves just referred to have been made, one such attempt being shown in the patent to Wynkoop, No. 1,995,491, dated March 26, 1935, and taking the form of a valve in which the valve body is formed with a substantially cylindrical opening adapted to receive a composite plug. This composite plug consists of a carrier of a size smaller than the opening referred to and having a recess or recesses in its outer surface adapted to receive a radially movable closure member. The parts are so arranged that upon a movement of the carrier in a direction to open the valve, the initial movement serves to retract the closure member from its seated position in a substantially radial direction, after which it is moved circumferentially to open position. In such valves as this, however, the carrier member is of necessity such that it does not seat firmly against the walls of the opening in which it is positioned and the walls of this opening at those portions which are not covered by the radially movable closure member are subjected to corrosive, erosive and other destructive action by the fluid passing therethrough. This action takes place when the valve is closed upon the major portion of the opening through the body member, and when the valve is open it takes place on a good portion of those walls and in addition upon that portion against which the closure member is adapted to seat when in closed position.

It is, therefore, an object of this invention to provide a structure which will have the frictionless characteristics of the second mentioned type of valve while at the same time providing for the protection of the seating surfaces of the valve against the action of the fluid passing therethrough.

Another object of this invention is to provide such a structure in which the minimum number of parts will be employed without sacrificing efficiency.

Another object of this invention is to provide such a valve which may be easily operated, which will have little wear due to friction and little depreciation due to erosion, corrosion, et cetera.

Another object of this invention is to provide a valve which will form a perfect seal when closed despite the presence of any grit or dirt between the seating parts thereof.

The invention hereinafter set forth is particularly useful in connection with the general type of valve disclosed but is not limited to such type of valve, being useful also in connection with other types of valves.

Another object of this invention is to provide a non-lubricated valve, and more particularly a non-lubricated valve of the plug valve type.

Other objects and advantages of this invention will become apparent from the following description taken in connection with the accompanying drawings, it being understood that the same are by way of example and illustration only and not by way of limitation.

Figure 1:
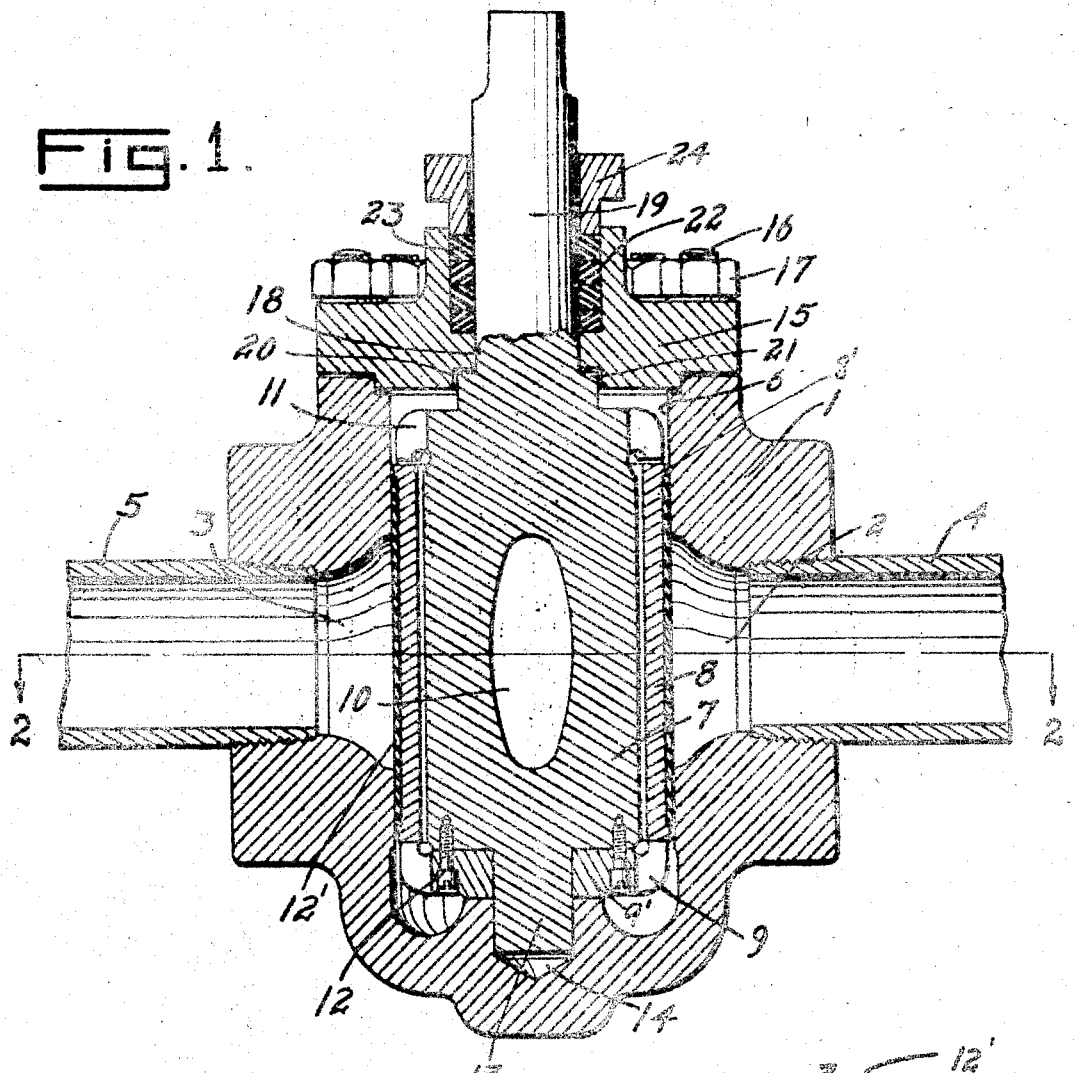
Fig. 1 is a longitudinal cross section through a valve constructed in accordance with this invention, the same being taken along the diameter of the plug member with the valve in closed position.

The valve illustrated comprises a body 1 having inlet and outlet openings 2 and 3, respectively, threaded to receive the pipe ends 4 and 5. It will be understood that either the opening 2 or the opening 3 may be considered as the inlet and the other the outlet, the valve being capable of operating for either direction of flow.

Within the valve body 1 there is formed a cylindrical opening 6 adapted to receive the composite rotatable assembly consisting of the plug 7, the closure members 8, and the closure retaining washer 9'. The plug or carrier 7 is provided with an opening 10 therethrough adapted when the plug is in proper position to be aligned with the openings 2 and 3 and forming a passageway for the fluid passing through the valve.

The closure members 8 are retained at one end by means of prongs 11 formed on the plug 7, and at the other end by the prongs 9 on the washer 9' which may if desired be secured to the plug 7 by means of screws 12 or the like. The closure members 8 are provided with an outer surface layer of a sealing material 12' which is capable of forming a seat against and a seal with respect to the inside walls of the opening 6, even though sand or other grit may be caught between these members and the walls of the opening 6.

The plug 7 adjacent its lower end is provided with a projecting part 13 adapted to fit within the opening 14 at one end of the chamber 6. At the opposite end, the chamber 6 is open to its full diameter to permit the insertion and removal of the plug assembly, this opening being closed normally by means of the cap 15 held in place by studs 16 and nuts 17. This cap 15 has a passageway therethrough at 18 to receive the stem 19 which is formed on one end of the plug 7. This cap is also provided with a notched portion 20 adapted to receive a shoulder 21 and form a thrust bearing for maintaining the plug 7 in proper position. Within the upper end portion of this cap 15 there is provided a stuffing box 22 adapted to receive packing rings 23 or the like the same being held down in sealed position by means of a gland 24.

Figure 2:
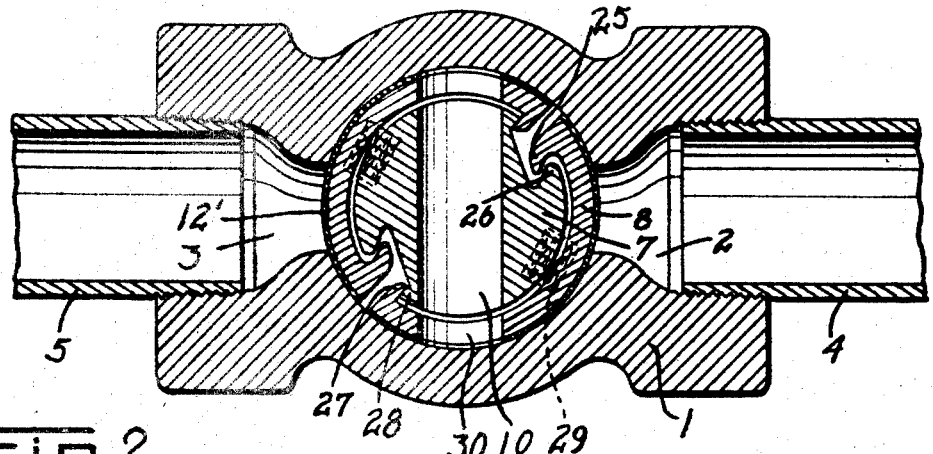
Fig. 2 shows a cross section at right angles to that shown in Fig. 1, taken along the line 2—2 of Fig. 1.
Figure 3:
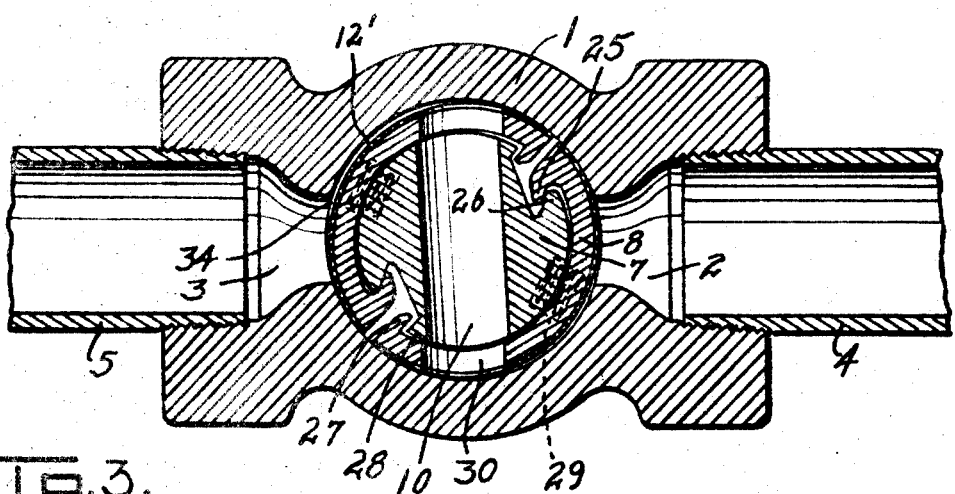
Fig. 3 is a view similar to Fig. 2 but showing the position of the parts just after the opening movement of the valve is begun.
Figure 4:
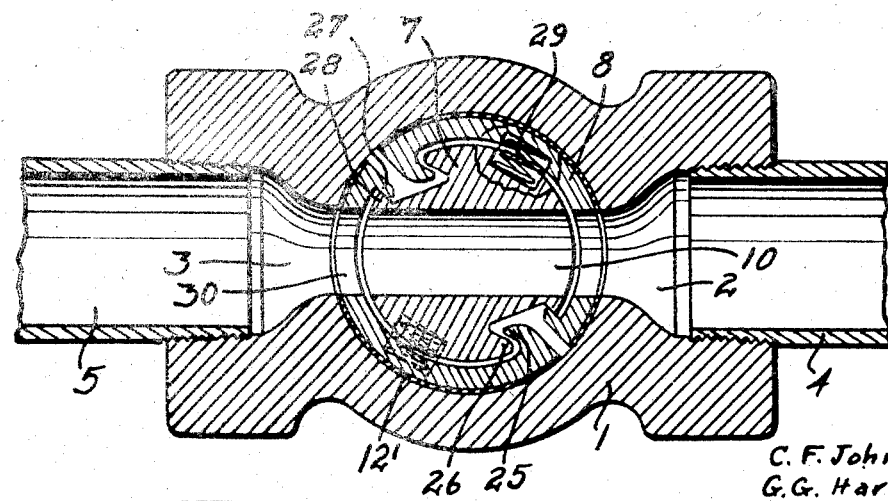
Fig. 4 is a view similar to Figs. 2 and 3 but showing the valve in open position.

Referring now more particularly to Figs. 2, 3 and 4 it will be seen that each of the closure members 8 is formed with an inwardly undercut portion 25 which may be termed a retracting hook. This hook is engaged by a similar formation 26 on the plug 7. The opposite end of each closure member is provided with an inwardly extending flange 27 adapted to engage the part 28, the parts 25 and 27 together serving to prevent any substantial amount of circumferential movement of the closure member with respect to the plug 7. The respective closure members which may be termed segments for the purpose of this application are also each provided with springs such as shown at 29 for urging these segments toward their seating surfaces.

It will also be seen that each segment is provided with an opening therethrough at 30 adapted when the segments are in open position with respect to the plug 7 to be aligned with the opening 10 through the body member and with the openings 2 and 3 through the valve body.

Figures 5, 6:
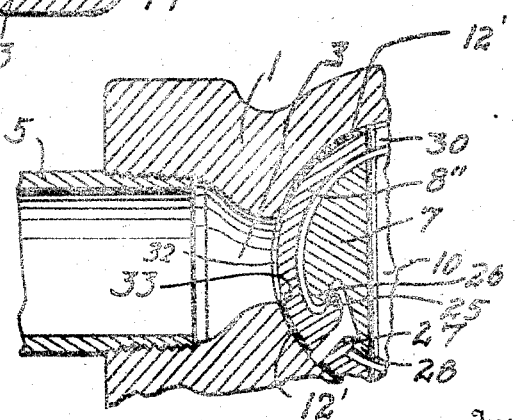
Fig. 5 is a view similar to the left hand portion of Fig. 2 illustrating a slight modification.
Fig. 6 is a view similar to Fig. 5 but showing a still further modification.

The lining material 12' on these segments is represented as covering the entire outer surface of each closure member, except, of course, for the openings 30 just referred to, and except for spaces along the ends of each segment as indicated at 8'. At these latter points, there is provided along the end edges of the segments a raised portion somewhat similar to a dam for the purpose of confining the lining material and preventing it from flowing past or over the ends of the segments under certain conditions which will presently be described. In Fig. 5 the lining material is illustrated as being cut out at 31 at that position which will be in alignment with the openings 2 or 3 at the time the valve is closed.

In Fig. 6 the segment is illustrated with the lining cut away as in Fig. 5, except with a slightly larger opening as shown at 32. Forming a dam within this cutaway portion of the lining so as to prevent the lining from flowing into the port over which it may be seated, is a dam 33. This dam is slightly larger in its outer dimensions than is the inlet to the port which it will cover, so that if forced tightly enough against the port this dam will contact the valve around the edges of the port.

Figure 7:
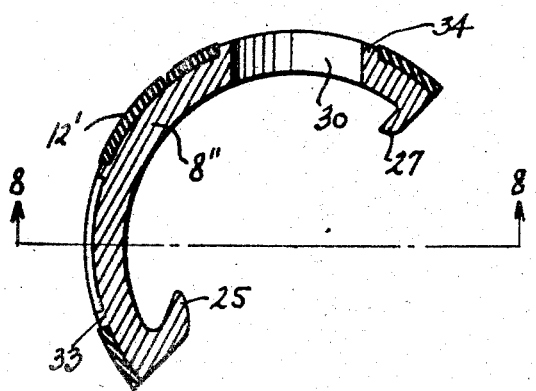
Fig. 7 is an enlarged transverse sectional view through one of the segments forming part of the valve illustrated.
Figure 8:
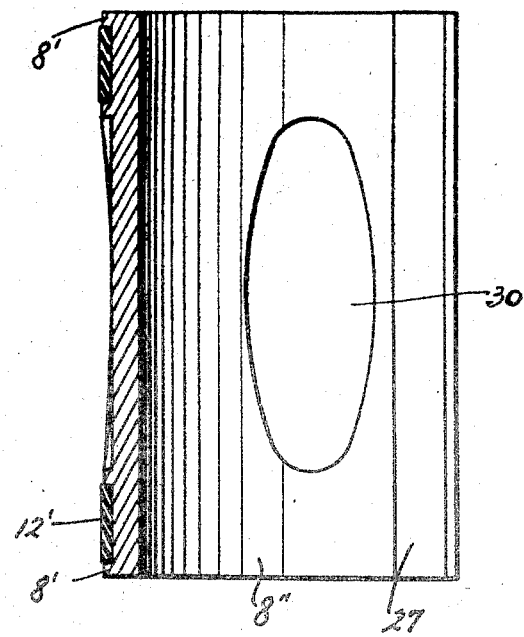
Fig. 8 is an enlarged longitudinal section of the same segment.
Figure 9:
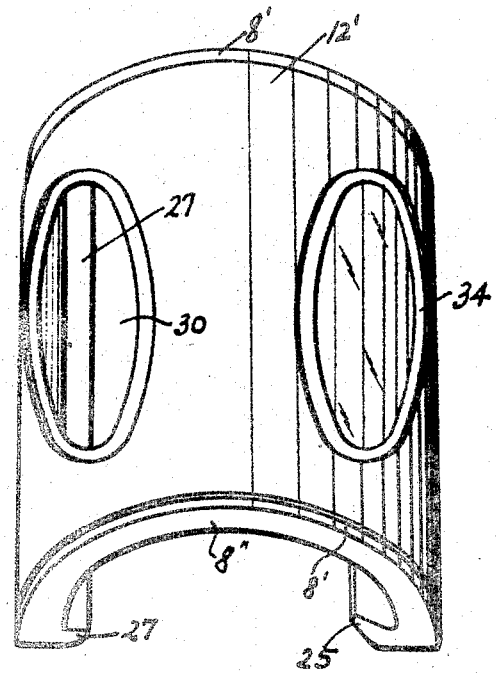
Fig. 9 is an enlarged perspective view of the same segment.
Figure 10:
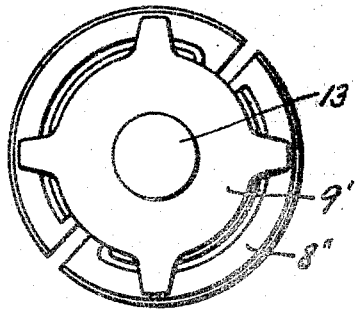
Fig. 10 is an end elevation of the composite plug assembly illustrated, showing the manner of mounting the segments upon the plug.

As shown in Figs. 7 and 9 there may also be a dam 34 around the opening through which flow of fluid takes place when the segment is in open position.

In operation, the valve is inserted in a line the flow in which is to be governed, in the same way that an ordinary valve would be inserted. Let it be assumed that the valve is then placed in closed position and fluid under pressure turned into the line on one side of the valve. That side will now be referred to as the inlet side and the opposite side as the outlet, although it will be appreciated that pressure may be applied to the valve in either direction and that either opening of the valve may serve as an inlet and either opening as an outlet.

Pressure applied against the inlet will force the segment covering the inlet away from its seat against the tension of the springs 29 and fluid under pressure will fill the space about the plug assembly within the valve body. This fluid under pressure will bear against the segment covering the outer opening and urge this segment against its seat over such opening. The lining which is of rubber or similar material is by this pressure urged to flow away from those points where it is subjected to the greatest pressure. In the form shown in Fig. 1 this pressure will cause a flow of the lining material toward the outlet opening. The lining material, however, is of such consistency and of such thinness that this flow is very greatly restrained. In the case of excessive pressure, movement of the segment toward the outlet opening will be limited by virtue of the dams 8' at the ends of the segments coming in contact with the body of the valve. This will, of course, remove a further load from the lining material and will prevent excessive extrusion thereof into the outlet opening. Also, these dams at the ends of the segments will prevent extrusion of the lining material toward the ends of the segments, due to the great pressure placed against the closing segment.

In the case where the lining is cut away to form an opening therein over that portion of the segment which seats against the outlet opening, any bunching or piling up of the lining material within the outlet opening will be prevented. This is of advantage, because when such bunching does occur, then an opening movement of the valve is apt to be interfered with by the rubber lining material bunching in the outlet opening, and when the valve is forcibly opened, despite such interference, there is likelihood of tearing or otherwise injuring the lining material not only within the outlet opening but about this opening where the lining material is adapted to be seated against the valve body.

In Fig. 6 a dam is shown about the opening in the lining which is adapted to overlie the outlet opening when the valve is in closed position. This dam tends to prevent extrusion of the lining material into the outlet opening and, furthermore, provides a support about the outlet opening and immediately adjacent thereto, so that when the lining material has been compressed by a predetermined amount this dam which is formed of metal will seat against the body of the valve and prevent further or excessive distortion of the lining material. It will be seen that in this form the great pressure exerted upon the segment will be taken first by the lining material which is of such thickness that it projects a small distance radially beyond the dams described, and pressure against the segment will cause this lining material to be distorted and to flow. The lining material cannot flow into the outlet opening because of the dam 33 and it cannot flow toward the ends of the segment because of the dams 8'. It must, therefore, flow circumferentially of the segment until these dams can firmly seat against the interior of the body member. The segments are of sufficient extent circumferentially to take up this flow without danger of damaging the lining material.

When it is desired to open the valve the same is rotated by means of the stem 19, the first result of which is to bring the hook-shaped parts 26 into engagement with the hook-shaped parts 25 on the segments. The engagement of these two inclined surfaces serves first to lift the segments away from the openings which they cover in the manner shown in Fig. 3, and then to move the segments circumferentially to the position shown in Fig. 4, in which position the valve is open. The action in first lifting the segments and then moving them circumferentially tends to prevent damage to the lining material during the opening movement, eliminates friction during this movement, and prevents sticking of the seating portions of the valve in such a manner that the valve cannot be opened. A dam about the opening through each of the respective segments is for the purpose of assisting in preventing a flow of the lining material through the opening 30, due to the extrusion of the lining material when the valve is in closed position. When in open position, however, flow may take place freely through the openings 10 and 30, so that very little pressure is exerted upon the segments tending to distort the lining material. The segments are, however, held against their seats while the valve is open by means of the springs 29, and it will be seen by reference to Fig. 4 that during the time the valve is open substantially the entire interior surface of the valve body is covered by the segments and the lining material is prevented from being eroded or corroded by the fluid flowing through the valve.

Referring to Fig. 1, however, it is to be noted that there is a space between the segments and the plug 7 and also a space within the body about each end of the plug. During the time the valve is open there will be some flow through all of these spaces, and this flow will serve the useful purpose of keeping these spaces free from settlings or abrasive material or the like, which might be contained in the fluid passing through the valve. Thus, all of the spaces within the valve are kept clean and free of grit and dirt so that the valve will not become stuck or clogged.

When it is desired to again close the valve, the plug 7 is rotated by means of the stem 19 and this rotation causes the shoulders 28 to engage the flanges 27 on the respective segments. It is now to be noted that this engagement, while it does not pull the flange 27 away from the valve body, it will nevertheless pull the segment as a whole away from the valve body, and particularly will it pull away from the valve body that portion of the segment which is intended to be seated over the outlet opening when the valve is closed. This makes for easier closing of the valve because the segment will first be lifted so that it does not contact the opening which it is to close, and then be moved over the opening, and then permitted to move substantially radially into closed position over the opening. This tends to prevent damage to the lining during the closing movement of the valve and to reduce the effort necessary to close the valve. Furthermore, it will be appreciated that when the closing movement progresses to a point where the opening 30 is almost out of register with the outlet opening, there will be an extremely high velocity of fluid passing through the relatively narrow opening remaining. This extremely high velocity will tend to tear away from the segment 8 the lining material immediately at the trailing edge of the opening 30. If the velocity of the fluid is sufficiently high it may even tear off a strip of this lining material all the way to the part which is to overlie the outlet opening when the valve is closed. This, of course, would render the valve inoperative and make its replacement necessary. The dam 34 which is shown in Figs. 7 and 9 as extending about the openings through the segments will tend to remove the effect of this rapid flow from the edge of the lining material and prevent the lining material from being so ripped from its anchorage on the segment during the closing of the valve.

It will be seen from the foregoing that a valve has been provided in which no lubrication is necessary yet in which friction will not substantially interfere or prevent the operation of the valve, even under high pressure.

It will further be seen that a valve has been provded which will form a perfect seal when in closed position regardless of the presence of grit or other foreign matter of small dimensions, which might be on the seating parts at the time the valve is closed.

Furthermore, it will be seen that a valve has been provided with a pliable seating material but that this seating material has been protected against being extruded or pinched during the use of the valve.

It will further be seen that the seats against which the closure members will seat during the various uses of the valve will be protected at all times, both while the valve is closed and while it is open, so that they will not be corroded or eroded by the material flowing through the valve.

All of the other objects and advantages sought by this invention may be accomplished by the structure set forth.

Having described our invention, we claim:

1. In a valve, a valve body having inlet and outlet openings, and a valve opening transversely of said inlet and outlet openings, a rotatable carrier within said valve opening, and a single closure member on said carrier adapted to close one of said first openings and engage substantially one-half of the inner surface of the opening in which said carrier is located, and sealing means on the outer surface of said closure member to form a sealing contact with the walls of said valve opening, said sealing means being cut away over that area of the closure member adapted to overlie the opening to be closed when the valve is in closed position.

2. In a valve, a valve body having inlet and outlet openings, and a valve opening transversely of said inlet and outlet openings, a rotatable carrier within said valve opening, and a single closure member on said carrier adapted to close one of said first openings and engage substantially one-half of the inner surface of the opening in which said carrier is located, and a sealing means on the outer surface of said closure member to form a sealing contact with the walls of said valve opening, said sealing means being cut away over that area of the closure member adapted to overlie the opening to be closed when the valve is in closed position, said closure member having a flange about said area within the cutaway portion of said sealing means.

CHARLES F. JOHNSON.
GEORGE G. HARRINGTON.